United States Patent
Godwin

[19]

[11] Patent Number: 5,313,604
[45] Date of Patent: May 17, 1994

[54] METHOD FOR LOCATING COMPRESSED DATA IN A COMPUTED MEMORY BACK UP DEVICE INCLUDING STEPS OF REFINING ESTIMATER LOCATION

[75] Inventor: Kurt E. Godwin, Loveland, Colo.

[73] Assignee: Hewlett-Packard Company, Palo Alto, Calif.

[21] Appl. No.: 612,801

[22] Filed: Nov. 13, 1990

[51] Int. Cl.$^5$ .......................................... G06F 12/02
[52] U.S. Cl. ............................ 395/425; 364/DIG. 1; 364/256.1; 382/56
[58] Field of Search .............................. 395/400, 425; 364/200 MS File, 900 MS File; 341/51 MS; 382/56 MS

[56] References Cited

U.S. PATENT DOCUMENTS

| | | | |
|---|---|---|---|
| 3,571,576 | 3/1971 | Satterfield | 235/92 |
| 3,643,226 | 2/1972 | Loizides et al. | 395/800 |
| 3,651,483 | 3/1972 | Clark et al. | 395/800 |
| 3,949,420 | 4/1976 | Older | 360/72.3 |
| 4,064,489 | 12/1977 | Babb | 395/250 |
| 4,068,298 | 1/1978 | Dechant et al. | 395/425 |
| 4,267,568 | 5/1981 | Dechant et al. | 395/600 |
| 4,276,597 | 6/1981 | Dissly et al. | 395/600 |
| 4,318,184 | 3/1982 | Millett et al. | 395/600 |
| 4,545,032 | 10/1985 | Mak | 341/95 |
| 4,626,829 | 12/1986 | Hauck | 341/63 |
| 4,633,393 | 12/1986 | Rundell | 395/800 |
| 4,701,745 | 10/1987 | Waterworth | 395/425 |
| 4,803,651 | 2/1989 | Galkowski | 395/500 |
| 4,817,036 | 3/1989 | Millett et al. | 395/600 |
| 4,866,440 | 9/1989 | Tsukiyama et al. | 341/95 |
| 4,868,570 | 9/1989 | Davis | 341/106 |
| 4,872,009 | 10/1989 | Tsukiyama et al. | 341/95 |
| 4,929,946 | 5/1990 | O'Brien et al. | 341/87 |
| 4,937,779 | 6/1990 | Ina | 395/425 |
| 5,101,487 | 3/1992 | Zalenski | 395/425 |

OTHER PUBLICATIONS

Quarter Inch Cartridge Standards Excerpt; pp. 1–45 Author: Industry Consortium; Date: Dec. 6, 1989.

*Primary Examiner*—Joseph L. Dixon
*Assistant Examiner*—Hiep T. Nguyen

[57] ABSTRACT

A method for utilizing computer memory devices when they have compressed data is disclosed. Specifically, the techniques focus on the field of operating devices so as to access randomly specified portions of such compressed data. It has particular applicability in computer tape drives such as are used in computer peripheral memory backup devices. These improved methods act to efficiently ascertain the location of the desired data with a minimum amount of effort. One embodiment of the present invention comprises the use of records which represent a number of files or an amount of data stored. Each record is independently compressed to allow independent access and uncompression. The records may include labels for identification purposes. Each label is typically an uncompressed value or series of values stored at the front of each record. Additionally, offsets are specified in labels to indicate the distance from the beginning of the first record to any item of data. The essence of the present invention is to simply calculate an estimated location utilizing an initial compression rate estimate, that is a percentage or ratio that represents the relationship between the average cumulative file size in compressed form of the same data in uncompressed form. Testing this estimate and subsequently refining it serves to efficiently search and retrieve the desired data.

37 Claims, 2 Drawing Sheets

METHOD FOR LOCATING COMPRESSED DATA IN A COMPUTED MEMORY BACK UP DEVICE INCLUDING STEPS OF REFINING ESTIMATER LOCATION

I. BACKGROUND OF THE INVENTION

Generally, the invention relates to the field of techniques for utilizing computer memory devices when they have compressed data. Specifically, the techniques focus on the field of operating devices so as to access randomly specified portions of such compressed data. It has particular applicability in computer tape drives such as are used in computer peripheral memory backup devices.

Since the advent of programmable data processing systems, or computers, the need to store information has grown dramatically. This information storage is frequently accomplished through devices which interconnect with the computer and act relatively independent of it in response to signals received from the main data processing functions of the computer. These devices, known as peripheral devices, act to receive data from the main computer memory and then to store such data on a separate media associated with the peripheral device.

One of the aspects of typical memory devices in computer systems is their volatility—they can unintentionally lose their contents occasionally. To overcome this undesirable aspect, backup devices have evolved. Such devices serve the simple function of separately storing large amounts of data on relatively non-volatile media. In the field of these specialized devices the use of magnetic tape media has greatly eclipsed all other types of storage media. This use is so broad that magnetic tape cartridges which are specifically designed to be used with computer backup devices have been developed. Such cartridges specifically meet the needs of computer users in a standardized and optimum fashion.

In essence, computer backup devices serve as a separate memory system on which data or information can be stored. As with any type of memory device, there are limitations on the amount of data which the media can hold. While removable media such as magnetic tape cartridges have been developed to allow the users to have virtually unlimited memory capacity, within each cartridge limits still exist. Accordingly, the technique of compressing the data has been developed. Through this technique data can be stored in a form which takes less memory space than as originally stored. In advanced backup devices, the step of compressing the data is usually accomplished automatically by the backup device itself without additional actions by the user.

A variety of techniques for compressing data exist. These algorithms each act uniquely to compress data or files from one size to a smaller size for storage purposes. The data or file in compressed form—that of reduced size—is then stored on the memory media. Because of the way these algorithms work, the reduction in size that any particular amount of data receives varies not only by the type of algorithm used, but also the contents of the data. For this reason, the reduction in size is not predictable.

As with any memory device associated with a computer, accessing such memory is an important element. To accomplish this on any type of memory device, the location of the desired data must first be determined. While this is a straight-forward operation when data is stored in uncompressed form, when compression is included it is more difficult for the simple reason that the amount of compression varies. For the present invention, access to the data also requires the additional step of uncompressing the data or file. Accordingly, the desire to locate and access the data in the shortest amount of time possible has long been a goal of those skilled in the art.

The present invention focuses upon the techniques used to locate and access data stored in compressed form on any type of media. While it is especially appropriate for serially-disposed media such as computer tape memory media, it has applicability to other media as well. Even though the concept of storing compressed data has been well known and even though those in the field of computer backup memory devices have long had to deal with the difficulty of locating data in compressed form, the desire for an efficient access technique has remained unsatisfied until the present invention. This was perhaps due to the fact that the standards which had developed among those involved acted to teach away from the direction of the present invention. As an example, the quarter-inch-cartridge (QIC) recording format standards promoted by the industry teach the use of tables for data location, then a separately generated compression map is utilized to locate the data in traditional manners.

Prior to the present invention those skilled in the art either serially uncompressed data until the appropriate aspect was located, or they relied upon a table look-up technique. In the table look-up technique, an additional step of creating a listing of file size after compression is accomplished. While such a technique does improve the ease with which the location of desired data can be ascertained, several drawbacks exist. First, the creation of the additional table information takes time, adding to the apparent memory access time. Second, additional memory space is required to store the information. Also, update or modification of the table has been difficult to accomplish efficiently.

Other inventions have addressed similar problems, however, they have not been readily adaptable to the problem addressed by the present invention. Rather, they have been directed to techniques to locate items in a listing which is itself compressed. As an example, U.S. Pat. No. 3,651,483 discloses techniques which allow searching a compressed index, not compressed data. Similarly, U.S. Pat. No. 3,643,226 dealt with the same problem in a fashion which is not adaptable to the problems addressed by the present invention.

II. SUMMARY OF THE INVENTION

The present invention is directed to improved methods for locating and accessing data stored in compressed form. These improved methods act to efficiently ascertain the location of the desired data with a minimum of effort. It is an object of the present invention to locate randomly selected data in the shortest possible time. It is also an object of the present invention to provide an efficient system which minimizes unnecessary memory storage. Another object is also to provide a technique which minimizes the amount of memory which the technique itself may require when embodied in software form. A further object is to provide a technique which accommodates update and modification needs.

It is also an object of the present invention to provide a method of locating and accessing data which is readily adaptable to a variety of compression algorithms and techniques. The method is designed such that it may be utilized literally with any compression technique. A further object in this regard is to provide a method which can easily be optimized for any given technique.

Another object of the present invention is to provide a method which does not require changes in existing memory storage techniques or format. An object is for the method to be independent of the compression algorithm, the data storage format, or the particular media involved.

Another object of the invention is to provide a method which can be optimized to the type of data and the type of compression technique involved. In this regard an object is to provide a method which automatically achieves such optimization.

Yet another object of the present invention is to provide a method which is particularly appropriate to computer tape drives such as are used in computer memory backup devices. Naturally, further object of the invention are disclosed throughout other areas of the specification and claims.

III. BRIEF DESCRIPTION OF THE DRAWINGS

IV. DETAILED DESCRIPTION OF THE PREFERRED EMBODIMENTS

The present invention can be embodied in several different ways. Essentially, it accomplishes the task of locating randomly selected data within a collection of compressed memory storage. The method actually calculates an estimated location and then repetitively refines the estimate until a sufficiently close location is identified.

Figure 2:
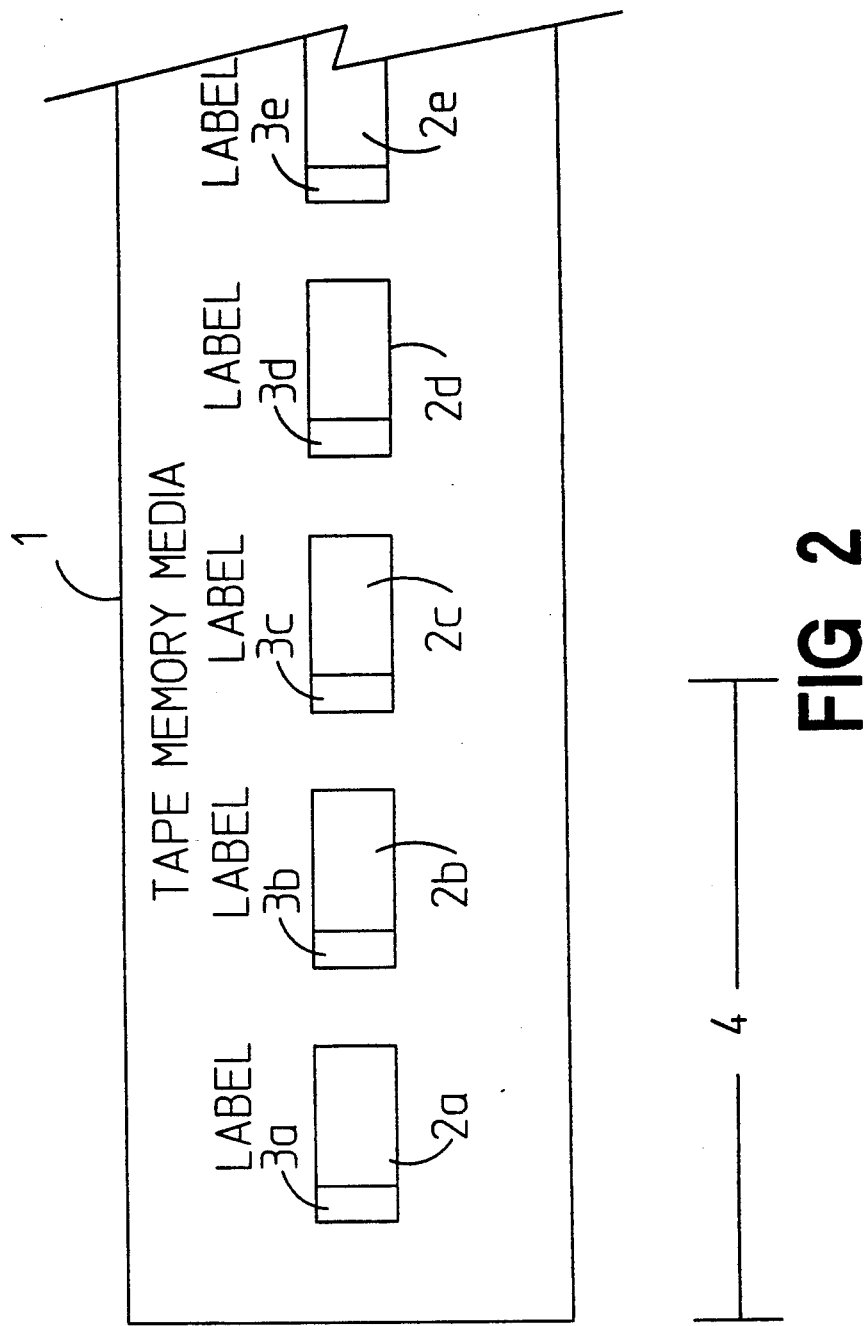
FIG. 2 is a schematic view of the way records are stored in typical tape storage format.

Referring to FIG. 2, the schematic of the record storage format, it can be seen that the memory media, in this case computer tape media (1), is divided into records (2a-2e). Each record represents a segment of computer tape media (1) in which a number of files or amount of data may be stored. Each record (2) is typically of fixed size so that all records (2) are identical in storage capacity. When compression is utilized either through operation of the computer or independently through automatic operation of the computer memory backup device, compression is accomplished such that each record (2) is compressed independently of the others. In this fashion each record (2) can be independently accessed and uncompressed.

As can be seen from FIG. 2, each of the records (2a-2e) may include corresponding labels (3a-3e) Label (3) is typically an uncompressed value or series of values stored at the front of each record (2) for identification purposes. Essentially, label (3) contains information from which the amount of data existing in uncompressed form in all prior records (2) can be derived. Under the standardized format, each label (3) is simply the number value of the amount of uncompressed data contained in all prior records. Additionally, label (3) could contain information regarding the amount of uncompressed data contained in its corresponding record (2). As was mentioned earlier, records (2) typically have fixed size. Most compression algorithms vary the amount of compression from file to file. Thus, even though record (2) has fixed size, the amount of data which it contains in uncompressed form will vary. This is perhaps the fundamental reason why locating data which is stored in compressed form is not as simple as doing the same for uncompressed data.

In addition, all data contained on computer tape media (1) has a characteristic offset (4). Characteristic offset (4) represents the distance (in terms of uncompressed memory storage) from the beginning of the first record (2a) to any item of data. As shown in FIG. 2, offset (4) represents that existing to the beginning of record (2c). Under the standard tape format, label (3c) contains characteristic offset (4) to the beginning of record (2c). Naturally, labels (3) can contain any type of information, this is simply the standard agreed upon by the industry.

In operation, the data is first compressed in segments such that in compressed form the segment is able to fit within the fixed size of record (2). It is then written sequentially onto computer tape media (1) as a series of compressed blocks of data each wholly contained within its own record (2). According to the accepted standards, when a tape backup operation is initiated—and before any compression occurs—an identification index is generated. This identification index may be something as simple as a table which contains a listing of the file names together with their uncompressed data size. This table is then written to computer tape media (1) in an easily identifiable position (such as the beginning of first record (2a)) so that upon insertion of the tape cartridge the identification index can be accessed most efficiently. As with the compression/uncompression routine, the generation of the identification index can occur in the main computer. Also like the compression/uncompression routine, it can also be accomplished through hardware, software or firmware operations. While the identification index can contain any information in tabular form, the standards have developed such that the identification index contains simply the file name and the uncompressed file size. While some prior art devices can add compressed file size to the identification index or to a separate table, this technique has drawbacks in that an operation must be accomplished after compression of the data and in that it is difficult to update the identification index and store in the most efficient way. Accordingly, the present invention offers a solution to the problem of locating any data which is stored in compressed form.

Figure 1:
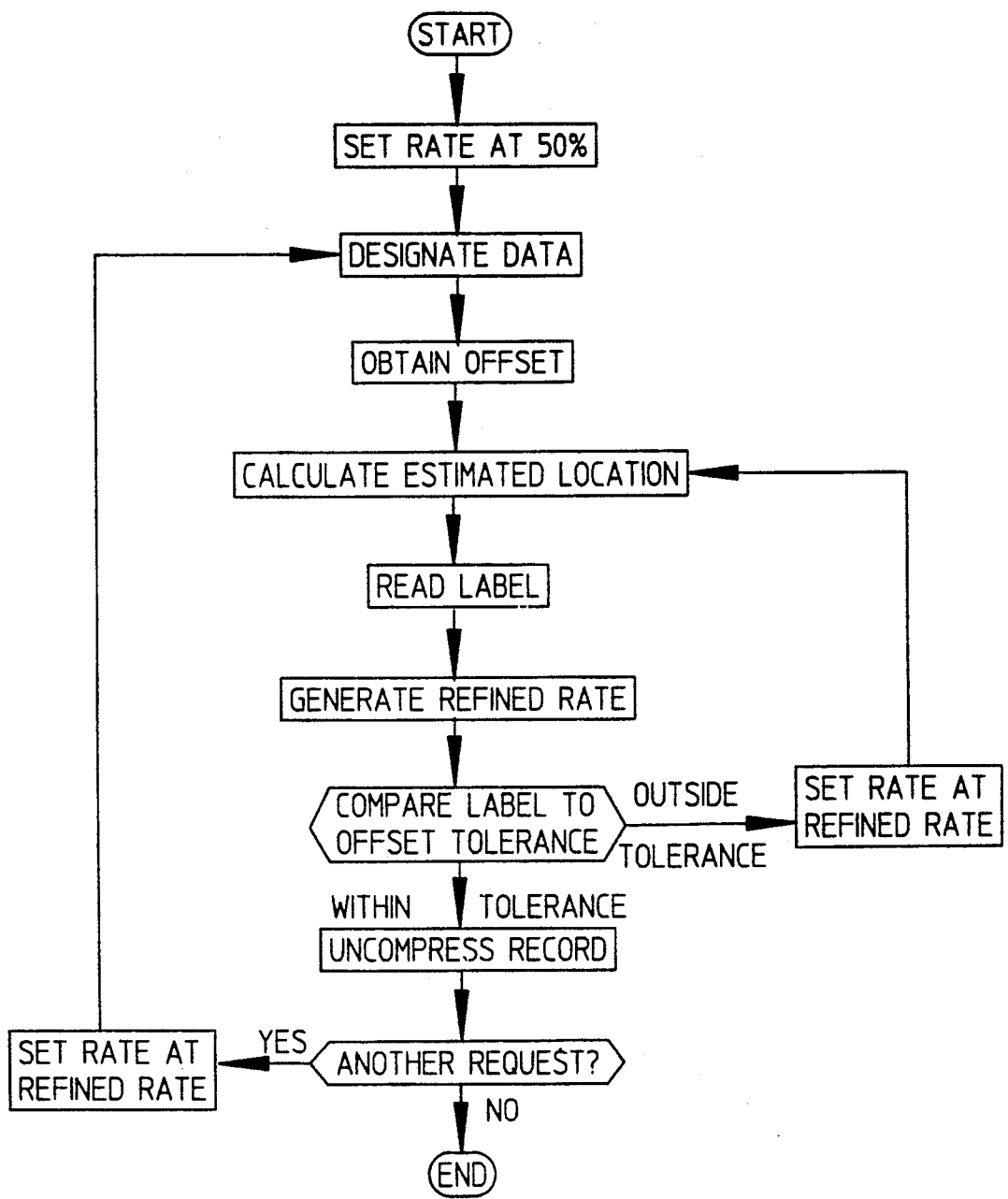
FIG. 1 is a flowchart of one embodiment of the method of the present invention.

Referring to FIG. 1, a flowchart of one preferred embodiment, the details of the invention can be understood. Once data has been compressed and stored in the traditional way, the method allows such data to be located and accessed in an efficient manner. In referring to FIG. 1 it should be understood that FIG. 1 represents a conceptual simplification of the actual operations and methods to aid in understanding the concepts of the present invention. The order in which actual operations are accomplished and even the operations themselves can and do vary in actual use as would be easily understood by those skilled in the art. Importantly, FIG. 1 is intended to convey to those skilled in the art the basic concepts such that one skilled in the art would be able to easily implement them in a variety of manners.

In actuality, the initiation of the method begins when data is designated. The essence of the present invention is to simply calculate an estimated location utilizing an initial compression rate estimate, that is a percentage or ratio that represents the relationship between the average cumulative file size in compressed form to the same value of the same data in uncompressed form. Obviously, this compression rate varies from file to file within any set of data. By utilizing an estimate of the compression rate and then testing this estimate by reading the label at the beginning of each record, the rate can be refined and further estimates can be made. In this fashion only a few iterations will be necessary to locate the data with sufficient accuracy to allow access and uncompression to pinpoint its location.

As can be seen in FIG. 1, the initial rate utilized is fifty percent (50%). This value represents an estimate that might be broadly utilized from one compression algorithm to another. Naturally, the initial compression rate could be set at some other percentage based upon the particular compression algorithm which is used.

Once the file has been designated, the method automatically calculates an estimated location using the initial compression rate estimate. To do this the method reads the identification index, ascertains the offset for the desired file, and then calculates an estimated location. As an example, if data XYZ is designated, the offset of such data can be either looked up in the identification index or derived by summing the sizes of all prior data. If, for instance, the offset is calculated to be 200 KBytes, the initial compression rate estimate of 50% would be applied to estimate that the desired data would be located at an offset of 100 KBytes into the magnetic tape medium. Since records (2) are of fixed size, for instance 40 KBytes each, it can then be estimated that the desired data might exist two and one-half records into the tape. The tape can then be advanced to the beginning of the third record (2c) and the third label (3c) could be read. Since this label typically contains the uncompressed cumulative offset value to the beginning of that record, this value can be compared to the 200 KByte value which was derived from the identification index and the compression rate estimate can be revised accordingly.

Continuing with the example, if label (3c) is read and the value indicates 120 KBytes, the compression rate estimate could be recalculated to be 80 KBytes (two records at 40 KBytes each) divided by 120 KBytes (the amount of uncompressed data contained in the two records) or about 66.7%. This refined compression rate estimate can then be utilized to further estimate the location at which the data is most likely to be found.

Another aspect of the invention is the manner in which the decision is made that the estimated location is "close enough" to the actual location to justify uncompression of the data and pinpointing of location through traditional techniques. This step, that of testing the compression rate estimate, is shown in FIG. 1 as the operation of comparing the offset value derived from the label to an offset tolerance. In actuality, this operation involves obtaining the difference between the value of the offset as shown by the label and that known to exist at the desired location. This difference can then be compared to a set acceptable error based upon the speed with which data can be uncompressed and the size of records (2). In the present embodiment the set acceptable error is set at 100 KBytes. Thus if the uncompressed offset at the beginning of the record containing the estimated location as indicated by the label is within 100 KBytes of the actual uncompressed offset, further refinement of the estimate is unnecessary. Naturally, it could vary and would still be considered within the scope of the present invention. In setting the set acceptable error, two concerns exist. First, the label should show that the record is not after the one containing the desired data. Mathematically, this simply means that the offset indicated by the label must be less than that of the desired data. Second, the set acceptable error must not be exceeded. Again, mathematically, the difference between the actual offset known for the desired data and that indicated by the label must be less than the set acceptable error. Naturally, the technique of comparing to some error could be any variety of things including the generation of a difference. Other techniques such as generating a ratio or other mathematical estimates could also be done and still be considered within the scope of the present invention.

If the estimated location is not within the set acceptable error, the step of refining the compression rate estimate can be accomplished. As shown in FIG. 1, this subroutine involves refining the compression rate estimate as described before and then re-estimating the location utilizing the refined compression rate estimate to recalculate an estimated location. The other steps can then be accomplished in similar fashion utilizing the refined rate estimate. When a location has been found which is within the set acceptable error, the record can then be uncompressed and the actual data located using traditional techniques. With a set acceptable error of about 100 KBytes and with records of a fixed size of actually 29 KBytes, this means that rarely will more than two records need to be uncompressed to locate the actual data.

An important element of the present invention is that of being able to use a refined estimate for the initial compression rate estimate. This can be accomplished in two ways. First (and simplest) as shown in FIG. 1, if another request exists, the last refined estimate can be utilized as an initial estimate for the new search. Again, since data compression varies among data types, there is a possibility that this refined estimate is more accurate than an initial estimate of fifty percent (50%). If it is, time can be saved in accessing the data.

A second possibility to refine even the initial compression rate estimate also exists. The initial compression rate estimate can be continually updated based upon any number of prior searches conducted. This could be done through some running average technique as could be easily understood by those skilled in the art. It could also be done by continually keeping a weighted or unweighted average of all or some of the prior searches. By storing an updated rate estimate together with some weight value (such as the number of searches used in calculating the value), continual update of the initial rate estimate could be accomplished. This would afford an advantage for each particular user since the type of data might vary less from user to user. In addition, the search routine could constantly be optimized and could in this fashion even grow better with age. This could of course occur among one search session, be constantly updated, or could occasionally be reset and started over.

The foregoing discussion and the claims which follow describe some preferred embodiments of the present invention. Particularly with respect to the claims, it should be understood that changes may be made without departing from the essence of the present invention. In this regard, it is intended that such changes would still fall within the scope of the present invention. It simply is not practical to describe and claim all possible revisions to the present invention which may be accomplished. To the extent such revisions utilize the essence of the present invention, each would naturally fall within the breadth of protection encompassed by this patent. This is particularly true for the present invention since its basic concepts and understandings are fundamental in nature and can be broadly applied.

I claim:

1. A method of accessing data stored in compressed form in a memory media associated with a programmable data processor, wherein such data has an identification index based upon uncompressed data, comprising the steps of:
   a. designating a desired data; then
   b. calculating an estimated location of said data within said memory media through use of said identification index based upon uncompressed data by applying a compression ratio; then
   c. reading said media at the estimated location; then
   d. locating said desired data through operation of said programmable data processor.

2. A method of accessing data stored in compressed form in a memory media associated with a programmable data processor as described in claim 1 and further comprising the step of refining said estimated location after accomplishing said step of reading said media.

3. A method of accessing data stored in compressed form in a memory media associated with a programmable data processor as described in claim 2 wherein said media is divided into records each having an identification label associated therewith and wherein said step of reading said media comprises the step of reading said identification label.

4. A method of accessing data stored in compressed form in a memory media associated with a programmable data processor as described in claim 3 wherein said label comprises information indicating the amount of data existing in all prior records in uncompressed form.

5. A method of accessing data stored in compressed form in a memory media associated with a programmable data processor as described in claim 4 wherein said step of calculating an estimated location of said data within said memory media comprises the step of applying a compression rate estimate to the amount of data existing in all prior records in uncompressed form as indicated by said label to obtain said compression ratio.

6. A method of accessing data stored in compressed form in a memory media associated with a programmable data processor as described in claim 5 wherein said step of applying a compression rate estimate comprises the step of generating an estimated amount of compressed data prior to said desired data.

7. A method of accessing data stored in compressed form in a memory media associated with a programmable data processor as described in claim 6 wherein said step of refining said estimated location comprises the step of testing said compression rate estimate through operation of the programmable data processor.

8. A method of accessing data stored in compressed form in a memory media associated with a programmable data processor as described in claim 7 wherein said step of refining said estimated location further comprises the steps of:
   a. changing said compression rate estimate after accomplishing said step of testing said compression rate estimate; and then
   b. reconducting said step of calculating an estimated location of said data within said memory media with said changed compression rate estimate.

9. A method of accessing data stored in compressed form in a memory media associated with a programmable data processor as described in claim 2 wherein said step of calculating an estimated location of said data within said memory media comprises the step of summing the total amount of data existing prior to the desired data to arrive at an uncompressed prior data sum.

10. A method of accessing data stored in compressed form in a memory media associated with a programmable data processor as described in claim 3 wherein said label consists of information indicating the total amount of data existing in all prior records in uncompressed form.

11. A method of accessing data stored in compressed form in a memory media associated with a programmable data processor as described in claim 10 wherein said step of calculating an estimated location of said data within said memory media comprises the step of summing the total amount of data existing prior to the desired data to arrive at an uncompressed prior data sum.

12. A method of accessing data stored in compressed form in a memory media associated with a programmable data processor as described in claim 5 wherein said step of refining said estimated location further comprises the steps of:
   a. changing said compression rate estimate; and then
   b. reconducting said step of calculating an estimated location of said data within said memory media with said changed compression rate estimate.

13. A method of accessing data stored in compressed form in a memory media associated with a programmable data processor as described in claim 5 wherein said step of refining said estimated location comprises the step of testing said compression rate estimate through operation of the programmable data processor.

14. A method of accessing data stored in compressed form in a memory media associated with a programmable data processor as described in claim 13 wherein said step of refining said estimated location further comprises the steps of:
   a. changing said compression rate estimate after accomplishing said step of testing said compression rate estimate; and then
   b. reconducting said step of calculating an estimated location of said data within said memory media with said changed compression rate estimate.

15. A method of accessing data stored in compressed form in a memory media associated with a programmable data processor as described in claim 13 wherein said step of testing said compression rate estimate further comprises the step of assuring that said amount of data existing in all prior records in uncompressed form as indicated by said label is less than that indicated by said uncompressed prior data sum after accomplishing said step of generating a difference between the amount of data existing in all prior records in uncompressed form indicated by said label and that indicated by said uncompressed prior data sum.

16. A method of accessing data stored in compressed form in a memory media associated with a programmable data processor as described in claim 15 wherein said step of refining said estimated location further comprises the step of comparing said difference to a set acceptable error after accomplishing said step of generating said difference between the amount of data existing in all prior records in uncompressed form indicated by said label and that indicated by said uncompressed prior data sum.

17. A method of accessing data stored in compressed form in a memory media associated with a programmable data processor as described in claim 16 wherein said method takes time to access the data and wherein said set acceptable error is set to optimize said access time.

18. A method of accessing data stored in compressed form in a memory media associated with a programmable data processor as described in claim 16 wherein said step of locating said data comprises the steps of:
   a. uncompressing said record located; then
   b. accessing the desired data at an access point within said record.

19. A method of accessing data stored in compressed form in a memory media associated with a programmable data processor as described in claim 18 wherein said step of locating said data further comprises the step of advancing said access point by an amount equal to said difference between the amount of data existing in all prior records in uncompressed form indicated by said label and that indicated by said uncompressed prior data sum.

20. A method of accessing data stored in compressed form in a memory media associated with a programmable data processor as described in claim 7 wherein said step of testing said compression rate estimate comprises the step of comparing said label to said uncompressed prior data sum.

21. A method of accessing data stored in compressed form in a memory media associated with a programmable data processor as described in claim 20 wherein said step of refining said estimated location further comprises the step of changing said compression rate estimate and reconducting said step of calculating an estimated location of said data within said memory media with said changed compression rate estimate after accomplishing said step of testing said compression rate estimate.

22. A method of accessing data stored in compressed form in a memory media associated with a programmable data processor as described in claim 1 wherein said step of calculating an estimated location of said data within said memory media comprises the step of summing the total amount of data existing prior to the desired data to arrive at an uncompressed prior data sum.

23. A method of accessing data stored in compressed form in a memory media associated with a programmable data processor as described in claim 22 wherein said step of calculating an estimated location of said data within said memory media further comprises the step of applying a compression rate estimate to said uncompressed prior data sum to obtain said compression ratio.

24. A method of accessing data stored in compressed form in a memory media associated with a programmable data processor as described in claim 23 wherein said step of applying a compression rate estimate comprises the step of generating an estimated amount of compressed data prior to said desired data.

25. A method of accessing data stored in compressed form in a memory media associated with a programmable data processor as described in claim 24 wherein said step of refining said estimated location comprises the step of testing said compression rate estimate through operation of the programmable data processor.

26. A method of accessing data stored in compressed form in a memory media associated with a programmable data processor as described in claim 25 wherein said step of refining said estimated location further comprises the steps of:
   a. changing said compression rate estimate after accomplishing said step of testing said compression rate estimate; and then
   b. reconducting said step of calculating an estimated location of said data within said memory media with said changed compression rate estimate.

27. A method of accessing data stored in compressed form in a memory media associated with a programmable data processor as described in claim 24 wherein said step of testing said compression rate estimate comprises the step of comparing said label to said uncompressed prior data sum.

28. A method of accessing data stored in compressed form in a memory media associated with a programmable data processor as described in claim 27 wherein said step of refining said estimated location further comprises the step of changing said compression rate estimate and reconducting said step of calculating an estimated location of said data within said memory media with said changed compression rate estimate after accomplishing said step of testing said compression rate estimate.

29. A method of accessing data stored in compressed form in a memory media associated with a programmable data processor as described in claim 28 wherein said step of comparing said label to said uncompressed prior data sum comprises the step of generating a difference between the amount of data existing in all prior records in uncompressed form indicated by said label and that indicated by said uncompressed prior data sum.

30. A method of accessing data stored in compressed form in a memory media associated with a programmable data processor as described in claim 27 wherein said step of comparing said label to said uncompressed prior data sum comprises the step of generating a difference between the amount of data existing in all prior records in uncompressed form indicated by said label and that indicated by said uncompressed prior data sum.

31. A method of accessing data stored in compressed form in a memory media associated with a programmable data processor as described in claim 27 wherein said step of testing said compression rate estimate further comprises the step of assuring that said amount of data existing in all prior records in uncompressed form as indicated by said label is less than that indicated by said uncompressed prior data sum after accomplishing said step of comparing said label to said uncompressed prior data sum.

32. A method of accessing data stored in compressed form in a memory media associated with a programmable data processor as described in claim 25 wherein said step of testing said compression rate estimate comprises the step of comparing said label to said uncompressed prior data sum.

33. A method of accessing data stored in compressed form in a memory media associated with a programmable data processor as described in claim 32 wherein said step of refining said estimated location further comprises the step of changing said compression rate estimate and reconducting said step of calculating an estimated location of said data within said memory media with said changed compression rate estimate after accomplishing said step of testing said compression rate estimate.

34. A method of accessing data stored in compressed form in a memory media associated with a programmable data processor as described in claims 5, 23, 26, 33 or 17 wherein the first compression rate utilized is the initial compression estimate and wherein said initial compression estimate is 50%.

35. A method of accessing data stored in compressed form in a memory media associated with a programmable data processor as described in claims 5, 23, 26, 33, or 17 wherein said method is accomplished repetitively for a plurality of searches and wherein said method further comprises the step of storing the last compression rate estimate after accomplishing said step of locating said data and wherein the compression rate estimate first utilized in the next search is said stored compression rate.

36. A method of accessing data stored in compressed form in a memory media associated with a programmable data processor as described in claims 5, 23, 26, 33 or 17 wherein said data is compressed through use of a compression technique, wherein the first compression rate utilized is the initial compression estimate and wherein said initial compression estimate is the average compression rate for that compression technique.

37. A method of accessing data stored in compressed form in a memory media associated with a programmable data processor as described in claim 36 wherein said method is accomplished repetitively for a plurality of searches and wherein said method further comprises the steps of:
 a. storing the average compression rate for all searches accomplished; and
 b. updating said average compression rate for all searches accomplished after accomplishing said step of locating said data.

* * * * *